(12) United States Patent  
Chen et al.

(10) Patent No.: US 12,210,918 B2
(45) Date of Patent: Jan. 28, 2025

(54) IDENTIFICATION CARD

(71) Applicant: GIESECKE+DEVRIENT MOBILE SECURITY GMBH, Munich (DE)

(72) Inventors: Wulin Chen, Hubei (CN); Bingbo Qiu, Hubei (CN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 18/018,675

(22) PCT Filed: Jul. 28, 2021

(86) PCT No.: PCT/CN2021/108947
§ 371 (c)(1),
(2) Date: Jan. 30, 2023

(87) PCT Pub. No.: WO2022/022573
PCT Pub. Date: Feb. 3, 2022

(65) Prior Publication Data
US 2023/0297799 A1    Sep. 21, 2023

(30) Foreign Application Priority Data

Jul. 31, 2020 (CN) .......................... 202021554056.9

(51) Int. Cl.
G06K 19/077    (2006.01)
G06K 19/00     (2006.01)
(Continued)

(52) U.S. Cl.
CPC ....... *G06K 19/02* (2013.01); *G06K 19/07749* (2013.01); *G06K 19/12* (2013.01)

(58) Field of Classification Search
CPC .. G06K 19/02; G06K 19/07749; G06K 19/12; G06K 19/07; G06K 19/0723
See application file for complete search history.

(56) References Cited

U.S. PATENT DOCUMENTS 9,697,459 B2 *  7/2017  Finn .......................... H01Q 7/00
9,965,716 B2    5/2018  Stern et al.
(Continued)

FOREIGN PATENT DOCUMENTS

CN    1427982 A  *  7/2003  ........... G06K 19/072
CN    2743905 Y     11/2005
(Continued)

OTHER PUBLICATIONS

CN209118328U Full-ceramic double-interface transaction card, 3 pages. (Year: 2023).*
(Continued)

*Primary Examiner* — Tuyen K Vo
(74) *Attorney, Agent, or Firm* — Workman Nydegger

(57) ABSTRACT

An identification card includes a ceramic substrate with opposite surfaces, and an accommodating part. A marking joint part is arranged in the accommodating part, and the orthogonal projection of the accommodating part on the ceramic substrate covers the orthogonal projection of the marking joint part on the ceramic substrate. The marking joint part includes a bearing layer and a marking part arranged on the bearing layer. The bearing layer and the marking part are of an integrated structure. The ceramic substrate is provided with an accommodating part for setting a marking joint part to ensure the flatness of the identification card, and the orthogonal projection of the accommodating part on the ceramic substrate covers the orthogonal projection of the marking joint part on the ceramic substrate.

15 Claims, 2 Drawing Sheets

(51) Int. Cl.
*G06K 19/02* (2006.01)
*G06K 19/12* (2006.01)

(56) References Cited

U.S. PATENT DOCUMENTS

| | | | | |
|---|---|---|---|---|
| 2007/0194421 | A1* | 8/2007 | Janke | H01L 23/552 |
| | | | | 257/679 |
| 2014/0184461 | A1* | 7/2014 | Kim | H01Q 7/06 |
| | | | | 343/788 |
| 2016/0229081 | A1 | 8/2016 | Williams et al. | |
| 2017/0163212 | A1* | 6/2017 | France | H02S 40/38 |

FOREIGN PATENT DOCUMENTS

| CN | 204883783 U | * | 12/2015 | ........... G06K 19/077 |
|---|---|---|---|---|
| CN | 107111766 A | * | 8/2017 | ............. B32B 13/04 |
| CN | 206703813 U | * | 12/2017 | |
| CN | 108960395 A | * | 12/2018 | ......... G06K 19/0772 |
| CN | 209118328 U | * | 7/2019 | |
| CN | 209149332 U | * | 7/2019 | ......... G06K 19/0772 |
| CN | 209182856 U | | 7/2019 | |
| CN | 213365546 U | | 6/2021 | |
| WO | 0210814 A1 | | 2/2002 | |
| WO | 2019079007 A1 | | 4/2019 | |
| WO | 2022022573 A1 | | 2/2022 | |

OTHER PUBLICATIONS

CN107111766A—transaction card including ceramic and ceramic composite material, 8 pages. (Year: 2023).*
CN209149332U—A ceramic-made double-interface transaction card, 4 pages. (Year: 2023).*
CN206703813U—A transaction card with three-dimensional effect, 3 pages. (Year: 2023).*
CN1427982A—Smart Card, 5 pages. (Year: 2023).*
CN108960395A—Ceramic double-interface trading card and ceramic processing technology thereof, 4 pages. (Year: 2024).*
CN204883783U—Smart Card, 12 pages. (Year: 2024).*
International Search Report from corresponding PCT Application No. PCT/CN2021/108947, Nov. 1, 2021.

* cited by examiner

IDENTIFICATION CARD

TECHNICAL FIELD

The present disclosure belongs to the technical field of electronic products, and in particular, relates to an identification card.

BACKGROUND

An identification card is a medium for identifying individuals and storing individual information. Various identification cards, such as employee's cards, ID cards, various financial transaction cards and VIP cards, have been widely used in our lives. We have developed various anti-counterfeiting functions and/or decorations providing special visual effects on various identification cards, such as financial cards. The identification cards in the prior art are easy to deform and have low structural strength.

Therefore, a new identification card is urgently needed.

SUMMARY

The embodiment of the disclosure provides an identification card, which adopts a ceramic substrate, so the identification card has higher material hardness and structural strength, and is not easy to deform.

On the one hand, the embodiment of the disclosure provides an identification card, which comprises a ceramic substrate with opposite surfaces, and at least one surface is provided with an accommodating part; wherein a marking joint part is arranged in the accommodating part, and the orthogonal projection of the accommodating part on the ceramic substrate covers the orthogonal projection of the marking joint part on the ceramic substrate, and the marking joint part comprises a bearing layer and a marking part arranged on the bearing layer, wherein the bearing layer and the marking part are of an integrated structure.

According to one aspect of the disclosure, the ceramic substrate comprises a first ceramic substrate and a second ceramic substrate which are connected with each other, and the accommodating part is arranged on at least one of the first ceramic substrate and the second ceramic substrate.

According to one aspect of the disclosure, the marking part comprises a chip part and an information marking part, and the chip part and the information marking part are respectively arranged in the accommodating part of the surfaces of the first ceramic substrate and the second ceramic substrate, which surfaces are opposite to each other.

According to one aspect of the disclosure, the information marking part comprises at least one of a magnetic stripe, a bank logo, a signature strip and a card body pattern part, and the bank logo and the card body pattern part are arranged in the form of standing gold.

According to one aspect of the disclosure, the orthogonal projection of the first ceramic substrate on the identification card at least partially overlaps with the orthogonal projection of the second ceramic substrate on the identification card.

According to one aspect of the disclosure, a clamping groove matched with the second ceramic substrate is arranged on the surface of the first ceramic substrate opposite to the second ceramic substrate, so that the second ceramic substrate can be arranged in the clamping groove.

According to one aspect of the disclosure, a pre-laminated layer in contact with the marking joint part is arranged between the first ceramic substrate and the second ceramic substrate, and the chip part of the marking part are connected with an antenna part of the pre-laminated layer.

According to one aspect of the disclosure, the orthogonal projection of the pre-laminated layer on the first ceramic substrate is rectangular; or, the orthogonal projection of the pre-laminated layer on the first ceramic substrate is annular.

According to one aspect of the disclosure, the pre-laminated layer is a flexible material layer.

According to one aspect of the disclosure, the pre-laminated layer further comprises a first fixing layer and a second fixing layer, and the antenna part is arranged between the first fixing layer and the second fixing layer.

According to one aspect of the disclosure, the accommodating part comprises a through hole penetrating the first ceramic substrate, and the marking part is arranged in the through hole.

According to one aspect of the disclosure, an adhesive layer is arranged between the accommodating part and the marking part and/or between the first ceramic substrate and the second ceramic substrate.

According to one aspect of the disclosure, a stereoscopic printing layer is arranged at the joint of the first ceramic substrate and the second ceramic substrate. According to one aspect of the disclosure, at least one surface of the ceramic substrate is provided with a pattern layer, the orthogonal projection of the pattern layer on the identification card does not overlap with the orthogonal projection of the marking joint part on the identification card.

According to one aspect of the disclosure, the pattern layer is formed on the surface of the ceramic substrate by one of firing glaze, electroplating and photoetching; or, a patterned groove formed by laser engraving is arranged on the surface of the ceramic substrate, and an ink layer is arranged in the patterned groove to form the pattern layer together.

Compared with the prior art, the identification card provided by the embodiment of the disclosure comprises a ceramic substrate and a marking joint part, wherein an accommodating part is arranged on the ceramic substrate for setting the marking joint part to ensure the flatness of the identification card, and the orthogonal projection of the accommodating part on the ceramic substrate covers the orthogonal projection of the marking joint part on the ceramic substrate, i.e., the length, width and other measurements of the accommodating part are slightly greater than or equal to the length, width and other measurements of the marking joint part, which is convenient for placing the marking joint part. The bearing layer of the marking joint part and the marking part are of an integrated structure, which has high structural strength and is not easy to separate. The identification card provided by this embodiment has higher material hardness and structural strength, and is not easy to deform due to the adoption of ceramic substrate.

BRIEF DESCRIPTION OF THE DRAWINGS

To provide a more detailed and clearer explanation of the technical solution of the embodiments of the disclosure, the drawings in the embodiments of the disclosure will be briefly introduced below. Obviously, the drawings described below are only part of many embodiments of the disclosure and other drawings can be obtained by those of ordinary skill in the art without paying creative labor.

In the drawings.

1—Ceramic Substrate; 11—First Ceramic Substrate; 12—Second Ceramic Substrate; 2—Marking Joint Part; 21—Bearing Layer; 22—Marking Part; 221—Chip Part; 222—Information Marking Part; 3—Pre-Laminated Layer; 31—First Fixing Layer; 32—Antenna Part; 33—Second Fixing Layer.

DETAILED DESCRIPTION

The features and exemplary embodiments of all aspects of the disclosure will be described in detail below. In the following detailed description, many specific details are given to provide a thorough understanding of the disclosure. However, it is apparent to those skilled in the art that the disclosure may be practiced without some of these specific details. The following description of the embodiments is given only to provide a better understanding of the disclosure by illustrating examples of the disclosure.

It should be noted that in this paper, relational terms such as first and second are only used to distinguish one entity or operation from another entity or operation, and do not necessarily require or imply such relationship or sequence between these entities or operations. Furthermore, the terms "comprise", "include" or any other variation thereof are used to cover non-exclusive inclusion, so that a process, method, article or equipment including a series of elements includes not only the mentioned elements, but also other elements not explicitly listed, or elements inherent to such process, method, article or equipment. Without further restrictions, the elements defined by the sentence "comprising . . . " do not exclude other same elements in the process, method, article or equipment comprising the elements.

To make the disclosure be better understood, the identification card according to the embodiment of the disclosure will be described in detail with reference to FIG. 1 to FIG. 4.

Figure 1:
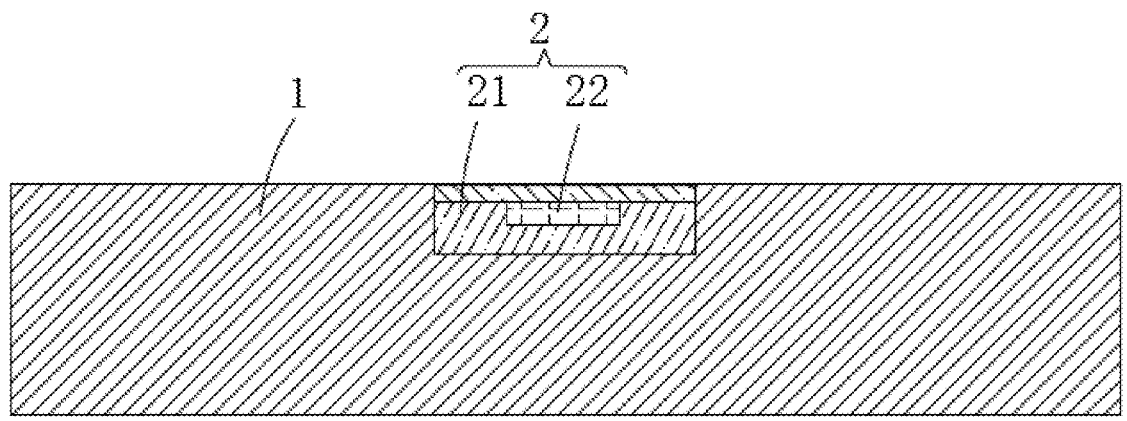
FIG. 1 is a schematic structural diagram of an identification card provided according to an embodiment of the disclosure.

Referring to FIG. 1, which is a structural schematic diagram of an identification card provided by an embodiment of the disclosure. The embodiment of the disclosure provides an identification card, which comprises: a ceramic substrate 1 with opposite surfaces, wherein at least one surface is provided with an accommodating part; and a marking joint part 2 arranged in the accommodating part, wherein the orthogonal projection of the accommodating part on the ceramic substrate 1 covers the orthogonal projection of the marking joint part 2 on the ceramic substrate 1, and the marking joint part 2 comprises a bearing layer 21 and a marking part 22 arranged on the bearing layer 21, wherein the bearing layer 21 and the marking part 22 are of an integrated structure.

The identification card provided by the embodiment of this disclosure comprises a ceramic substrate 1 and a marking joint part 2, wherein an accommodating part is arranged on the ceramic substrate 1 for setting the marking joint part 2 to ensure the flatness of the identification card, and the orthogonal projection of the accommodating part on the ceramic substrate 1 covers the orthogonal projection of the marking joint part 2 on the ceramic substrate 1, i.e., the length, width and other measurements of the accommodating part are slightly greater than or equal to the length, width and other measurements of the marking joint part 2, which is convenient for placing the marking joint part 2, and the bearing layer 21 of the marking joint part 2 and the marking part 22 are of an integrated structure, which has high structural strength and is not easy to separate. The identification card provided by this embodiment has higher material hardness and structural strength, and is not easy to deform due to the adoption of ceramic substrate.

The marking part 22 may be a functional module for user identification, such as a chip, a magnetic stripe, a signature strip, a bank logo or an anti-counterfeit label, and the bearing layer 21 may be made of one of or the combination of PVC (Polyvinyl chloride), PET (Polyethylene terephthalate), ABS (Styrene resin), or other resin materials. The bearing layer 21 has a sheet structure for bearing the marking part 22, and the bearing layer 21 and the marking part 22 can be formed into an integrated structure by stamping or other processes. Specifically, at first, a plurality of marking parts 22 are uniformly arranged on a large bearing layer 21, and then an integrated structure including the large bearing layer 21 and a plurality of marking parts 22 is formed by stamping or other processes, and at last an integrated structure including only one marking part 22 is formed by stamping, cutting or other processes to improve production efficiency. After that, the formed integrated structure is connected with the accommodating part by gluing.

Figure 2:
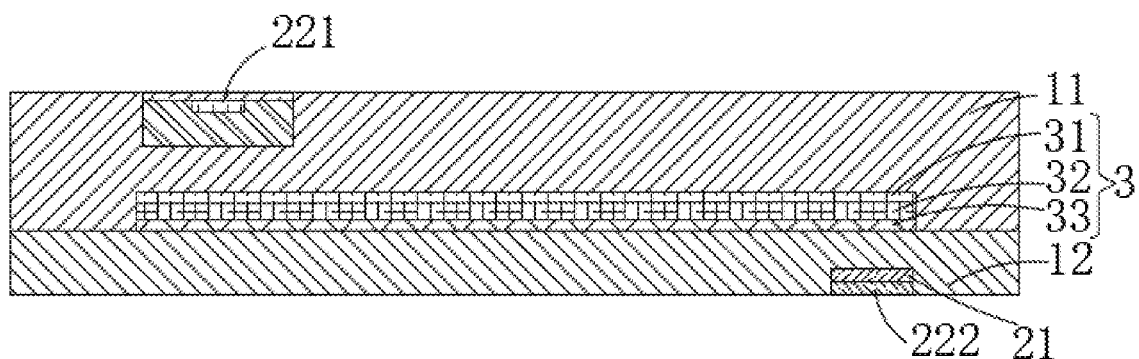
FIG. 2 is a schematic structural diagram of an identification card provided by according to another embodiment of the disclosure.

Referring to FIG. 2, in some optional embodiments, the ceramic substrate 1 includes a first ceramic substrate 11 and a second ceramic substrate 12 that are connected with each other, and the accommodating part is arranged on at least one of the first ceramic substrate 11 and the second ceramic substrate 12.

It can be understood that the first ceramic substrate 11 and the second ceramic substrate 12 are attached to each other to form the ceramic substrate 1, and the accommodating part is located on the surface opposite to the other of the first ceramic substrate 11 or the second ceramic substrate 12, i.e., the accommodating part may be a closed space, and the marking joint part 2 can be fixed between the first ceramic substrate 11 and the second ceramic substrate 12, or a through hole can be perforated on the first ceramic substrate 11 or the second ceramic substrate 12 to expose the marking part 22 of the marking joint part 2 to the outside to facilitate identifying.

In addition to the above-mentioned split structure in which the ceramic substrate 1 includes the first ceramic substrate 11 and the second ceramic substrate 12, the ceramic substrate 1 may also adopt an integrated structure as shown in FIG. 1, i.e., the ceramic substrate 1 has an integral sheet-like structure, herein an accommodating part is directly arranged on the outer surface of the ceramic substrate 1, and the marking joint part 2 is connected with the ceramic substrate 1 by gluing or other processes.

Figure 3:
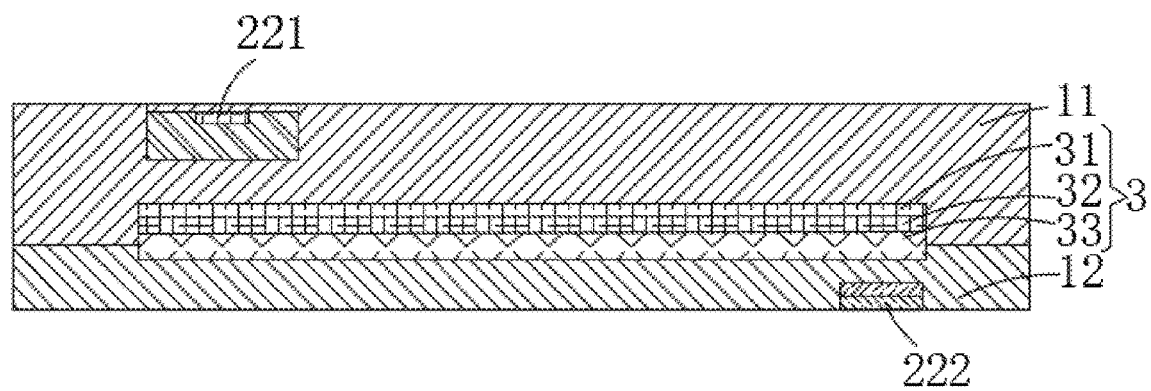
FIG. 3 is a schematic structural diagram of a display panel provided according to another embodiment of the disclosure.

Referring to FIG. 3, in some optional embodiments, the marking part 22 includes a chip part 221 and an information marking part 222, and the chip part 221 and the information marking part 222 are respectively arranged in the accommodating parts on the surfaces of the first ceramic substrate 11 and the second ceramic substrate 12, which surfaces are opposite to each other.

It should be noted that the accommodating part is not limited to be arranged only on one of the first ceramic substrate 11 or the second ceramic substrate 12, but may also be arranged on both the first ceramic substrate 11 and the second ceramic substrate 12, i.e., the accommodating part includes a first accommodating part and a second accommodating part, and the chip part 221 and the information marking part 222 are respectively fixed in the first accommodating part and the second accommodating part, herein the chip part 221 may specifically includes a carrier tape, a chip or other components.

In some optional embodiments, the information marking part 222 includes at least one of a magnetic stripe, a bank logo, a signature strip and a card pattern part, and the bank logo and the card pattern part are arranged in the form of standing gold.

It should be noted that the standing gold form specifically refers to the stereoscopic metal pattern process, i.e., the bank logo, card body pattern part, etc. can protrude to the outer surface of the ceramic substrate 1 to present a stereoscopic effect and improve the grade and effect of the layout design of the identification card.

In some optional embodiments, the orthogonal projection of the first ceramic substrate 11 on the identification card at least partially overlaps with the orthogonal projection of the second ceramic substrate 12 on the identification card.

It can be understood that the first ceramic substrate 11 and the second ceramic substrate 12 may be rectangular cards with the same shape and size, i.e., the orthogonal projection of the first ceramic substrate 11 on the identification card completely overlaps with the orthogonal projection of the second ceramic substrate 12 on the identification card, which facilitates the alignment connection between the first ceramic substrate 11 and the second ceramic substrate 12. Certainly, the first ceramic substrate 11 and the second ceramic substrate 12 may also have different shapes and sizes, as long as they can be matched and connected with each other.

On the basis of the above embodiments, the surface of the first ceramic substrate 11 opposite to the second ceramic substrate 12 is provided with a clamping groove matched with the second ceramic substrate 12, so that the second ceramic substrate 12 can be arranged in the clamping groove.

The surface of the first ceramic substrate 11 opposite to the the second ceramic substrate 12 is provided with a clamping groove matched with the second ceramic substrate 12, i.e., the shape and size of the first ceramic substrate 11 are different from the shape and size of the second ceramic substrate 12, and the size of the first ceramic substrate 11 is larger than the size of the second ceramic substrate 12, so that the second ceramic substrate 12 can be accommodated by the clamping groove, and since the second ceramic substrate 12 is arranged in the clamping groove, separation of the first ceramic substrate 11 from the second ceramic substrate 12 can be effectively avoided, thus further improving the connection stability of the identification card.

Referring to FIG. 3, in some optional embodiments, a pre-laminated layer 3 in contact with the marking joint part 2 is arranged between the first ceramic substrate 11 and the second ceramic substrate 12, and the chip part 221 of the marking part 22 is connected with the antenna part of the pre-laminated layer 3.

It should be noted that the pre-laminated layer 3 generally refers to an INLAY layer, and optionally, the pre-laminated layer 3 is a flexible material layer, which specifically refers to a pre-laminated product in which multiple PVC sheets and antennas or coils are laminated together. The pre-laminated layer 3 generally consists of two or three layers and there are no printed patterns on the surface, and INLAY products are suitable for the mass production of multi-variety cards at an early stage. Different non-contact cards are formed by laminating again the materials with different printed patterns on the top and bottom of the INLAY. PCB (Printed Circuit Board) or FPC (Flexible Printed Circuit), which are similar to NFC antenna (Near Field Communication) for mobile phones, may also be used.

Figure 4:
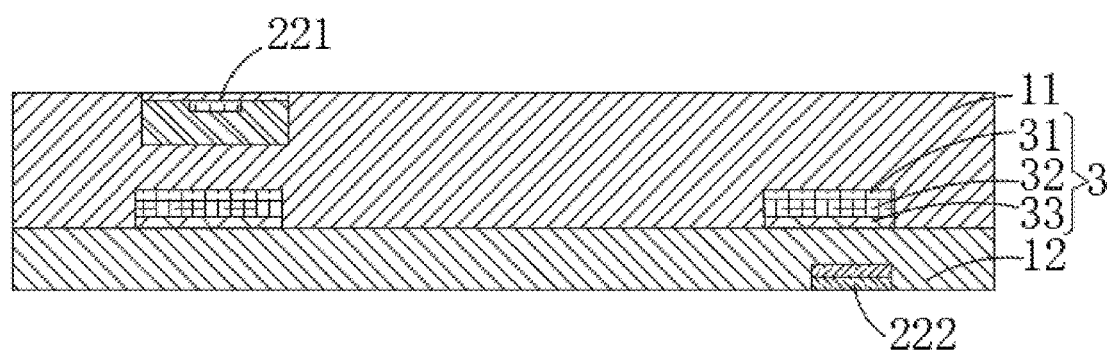
FIG. 4 is a schematic structural diagram of a display panel provided according to another embodiment of the disclosure.

In some optional embodiments, the orthogonal projection of the pre-laminated layer 3 on the first ceramic substrate 11 is rectangular, and the antenna part is arranged in the rectangular pre-laminated layer 3; or, as shown in FIG. 4, in order to reduce the material consumption, the orthogonal projection of the pre-laminated layer 3 on the first ceramic substrate 11 is annular, the annular shape may specifically be square or round, and the antenna part is annularly arranged corresponding to the pre-laminated layer 3, and the first ceramic substrate 11 and/or the second ceramic substrate 12 are provided with a groove matched with the shape and size of the pre-laminated layer 3.

The marking part 22 includes a chip part 221 connected with the antenna part of the pre-laminated layer 3. Specifically, the chip part 221 is provided with a set of coils to communicate with the antenna part of the pre-laminated layer 3, so as to realize functions such as signal transmission.

Specifically, the pre-laminated layer 3 further includes a first fixing layer 31 and a second fixing layer 33, and the antenna part is arranged between the first fixing layer 31 and the second fixing layer 33.

The first fixing layer 31 and the second fixing layer 33 may specifically be made of PVC (Polyvinyl chloride) or other materials to fix the antenna part.

Figure 5:
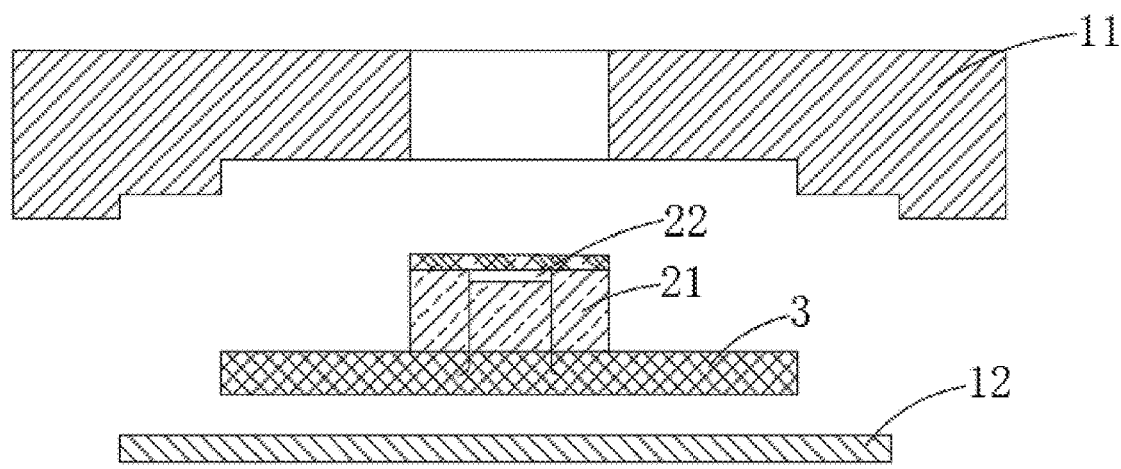
FIG. 5 is an exploded view of the display panel provided according to an embodiment of the disclosure.

Referring to FIG. 5, in order to facilitate the use of the identification card, in some optional embodiments, the accommodating part includes a through hole penetrating the first ceramic substrate 11, herein the marking part 22 is arranged in the through hole.

It can be understood that the marking part 22 is arranged in the through hole, and certain parts of the marking part 22, such as an anti-counterfeiting label, a magnetic strip and a signature strip, which need to be exposed to the ceramic substrate, can be exposed through the through hole. Optionally, an adhesive layer or a 3D printing layer can be arranged between the marking part 22 and the inner wall of the through hole for fixing and connecting, so as to prevent the marking part 22 from moving during use.

In order to further improve the connection stability between various parts of the identification card, in some optional embodiments, adhesive layers are provided between the accommodating part and the marking part 22, and between the first ceramic substrate 11 and the second ceramic substrate 12.

Specifically, the shape and size of the adhesive layer are matched with the shape and sizes of the accommodating part, the first ceramic substrate 11 or the second ceramic substrate 12, so as to ensure an enough contact area between the adhesive layer and each component, thus improving the bonding effect.

Optionally, a stereoscopic printing layer is provided at the joint between the first ceramic substrate 11 and the second ceramic substrate 12, and the stereoscopic printing layer is a film formed by a 3D printing process, and can effectively connect the first ceramic substrate 11 and the second ceramic substrate 12 to avoid separation of the first ceramic substrate 11 from the second ceramic substrate 12.

In some optional embodiments, at least one surface of the ceramic substrate 1 is provided with a pattern layer to display patterns or text information, and the orthogonal projection of the pattern layer on the identification card does not overlap with the orthogonal projection of the marking joint part 2 on the identification card. Specifically, the pattern layer is formed on the surface of the ceramic substrate 1 by one of firing glaze, electroplating and photoetching; or, a patterned groove formed by laser engraving is arranged on the surface of the ceramic substrate 1, and an ink layer is arranged in the patterned groove to form a pattern layer together. The ceramic substrate 1 is made of ceramic material. The ceramic raw materials are melted at high temperature and injected into a molding die, and then the accommodating part on the ceramic surface is preformed, or it can be obtained by machining.

In some optional embodiments, the ceramic substrate 1 comprises at least one of a metal oxide, a metal carbide, a metal boride, a metal nitride and a metal silicide, i.e., the ceramic substrate 1 may be made of only one of a metal oxide, a metal carbide, a metal boride, a metal nitride and a metal silicide, or may also be made of a mixture of a plurality of the above materials.

Above is only a specific embodiment of the disclosure, and those skilled in the art can clearly understand that for the convenience and conciseness of description, one can refer to the corresponding processes in the aforementioned embodiments for the specific manufacturing processes of the systems, modules and units described above, thus the specific manufacturing processes will not be described in detail here. It should be understood that the scope of the disclosure is not limited to this, and any person familiar with the art can easily think of various equivalent modifications or substitutions within the technical scope disclosed by the disclosure, all of which should be covered within the scope of the disclosure.

It should also be further noted that the exemplary embodiments mentioned in the disclosure describe some methods or systems based on a series of steps or devices. However, the disclosure is not limited to the sequence of the above steps, i.e., the steps may be executed in the sequence mentioned in the embodiment, or different from the sequence in the embodiment, or several steps may be executed synchronously.

The invention claimed is:

1. An identification card, comprising:
    a ceramic substrate with opposite surfaces, wherein the substrate is provided with an accommodating part extending from at least one of the surfaces; and
    a marking joint part arranged in the accommodating part,
    wherein the orthogonal projection of the accommodating part on the ceramic substrate covers the orthogonal projection of the marking joint part on the ceramic substrate, and the marking joint part comprises a bearing layer and a marking part arranged on the bearing layer,
    wherein a length, width and other measurements of the marking joint part are configured to fill a length, width and other measurements of the accommodating part;
    wherein the bearing layer and the marking part are of an integrated structure;
    wherein the orthogonal projection of the bearing layer on the accommodating part covers the orthogonal projection of the marking part on the accommodating part;
    wherein an adhesive is arranged between the integrated structure and the ceramic substrate.

2. The identification card according to claim 1, wherein the ceramic substrate comprises a first ceramic substrate and a second ceramic substrate which are connected with each other, and the accommodating part is arranged on at least one of the first ceramic substrate and the second ceramic substrate.

3. The identification card according to claim 2, wherein the marking part comprises a chip part and an information marking part, and the chip part and the information marking part are respectively arranged in the accommodating parts of the surfaces of the first ceramic substrate and the second ceramic substrate, which surfaces are opposite to each other.

4. The identification card according to claim 2, wherein the orthogonal projection of the first ceramic substrate on the identification card at least partially overlaps with the orthogonal projection of the second ceramic substrate on the identification card.

5. The identification card according to claim 2, wherein a clamping groove matched with the second ceramic substrate is arranged on the surface of the first ceramic substrate opposite to the second ceramic substrate, so that the second ceramic substrate is arranged in the clamping groove.

6. The identification card according to claim 3, wherein the information marking part comprises at least one of a magnetic stripe, a bank logo, a signature strip and a card body pattern part, and the bank logo and the card body pattern part are arranged in the form of standing gold.

7. The identification card according to claim 3, wherein a pre-laminated layer in contact with the marking joint part is arranged between the first ceramic substrate and the second ceramic substrate, and the chip part of the marking part are connected with an antenna part of the pre-laminated layer.

8. The identification card according to claim 7, wherein the orthogonal projection of the pre-laminated layer on the first ceramic substrate is rectangular; or,
    the orthogonal projection of the pre-laminated layer on the first ceramic substrate is annular.

9. The identification card according to claim 7, wherein the pre-laminated layer is a flexible material layer.

10. The identification card according to claim 7, wherein the pre-laminated layer further comprises a first fixing layer and a second fixing layer, and the antenna part is arranged between the first fixing layer and the second fixing layer.

11. The identification card according to claim 1, wherein at least one surface of the ceramic substrate is provided with a pattern layer, and the orthogonal projection of the pattern layer on the identification card does not overlap with the orthogonal projection of the marking joint part on the identification card.

12. The identification card according to claim 11, wherein the pattern layer is formed on the surface of the ceramic substrate by one of firing glaze, electroplating and photoetching; or,
    a patterned groove formed by laser engraving is arranged on the surface of the ceramic substrate, and an ink layer is arranged in the patterned groove to form the pattern layer together.

13. The identification card according to claim 1, wherein the bearing layer and the marking part are stamped together, forming the integrated structure.

14. The identification card according to claim 1, the bearing layer is provided as a sheet structure.

15. The identification card according to claim 1, wherein the bearing layer comprises one or more of Polyvinyl chloride, Polyethylene terephthalate, and Styrene resin.

* * * * *